Feb. 14, 1939.  V. L. SHAW  2,146,860
BEVERAGE SHAKER
Filed April 8, 1937  2 Sheets-Sheet 1

Inventor
Vincent L. Shaw.
By Anns, Thiess, Olsen & Mecklenburger
Attys.

Feb. 14, 1939.   V. L. SHAW   2,146,860
BEVERAGE SHAKER
Filed April 8, 1937   2 Sheets-Sheet 2
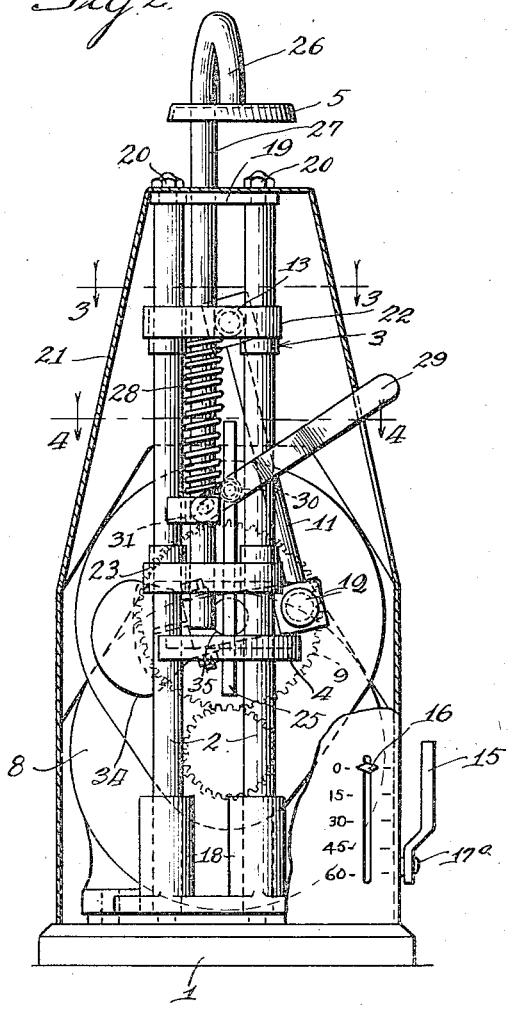
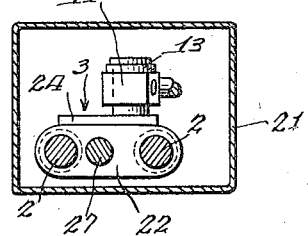
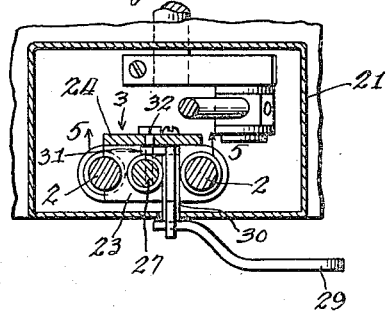
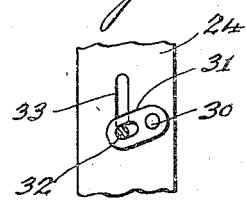
Inventor:
Vincent L. Shaw Patented Feb. 14, 1939

2,146,860

UNITED STATES PATENT OFFICE 2,146,860

BEVERAGE SHAKER

Vincent L. Shaw, Evanston, Ill.

Application April 8, 1937, Serial No. 135,610

4 Claims. (Cl. 259—91)

My invention relates to beverage shakers.

One of the objects of my invention is to provide an improved beverage shaking apparatus which will insure that the beverage is thoroughly shaken and mixed.

A further object of my invention is to provide a beverage shaking apparatus in which the gripping jaws which engage the beverage container and cover may be opened and closed easily, quickly, and efficiently.

A further object of my invention is to provide an improved beverage shaker which will be simple, compact, durable, and efficient in operation.

A further object of my invention is to provide an improved beverage shaker, in which time-controlled means are provided for stopping the electric motor after a predetermined time has elapsed, thus enabling the attendant, after putting the shaker in operation, to attend to other matters.

Further objects and advantages of the invention will be apparent from the description and claims.

In the drawings, in which an embodiment of my invention is shown,

Fig. 2 is a front elevational view of the shaker, parts of the casing being shown in section;

Fig. 3 is a horizontal section substantially on the line 3—3 of Fig. 2;

Fig. 4 is a horizontal section substantially on the line 4—4 of Fig. 2; and

Fig. 5 is a vertical section substantially on the line 5—5 of Fig. 4.

Figure 1:
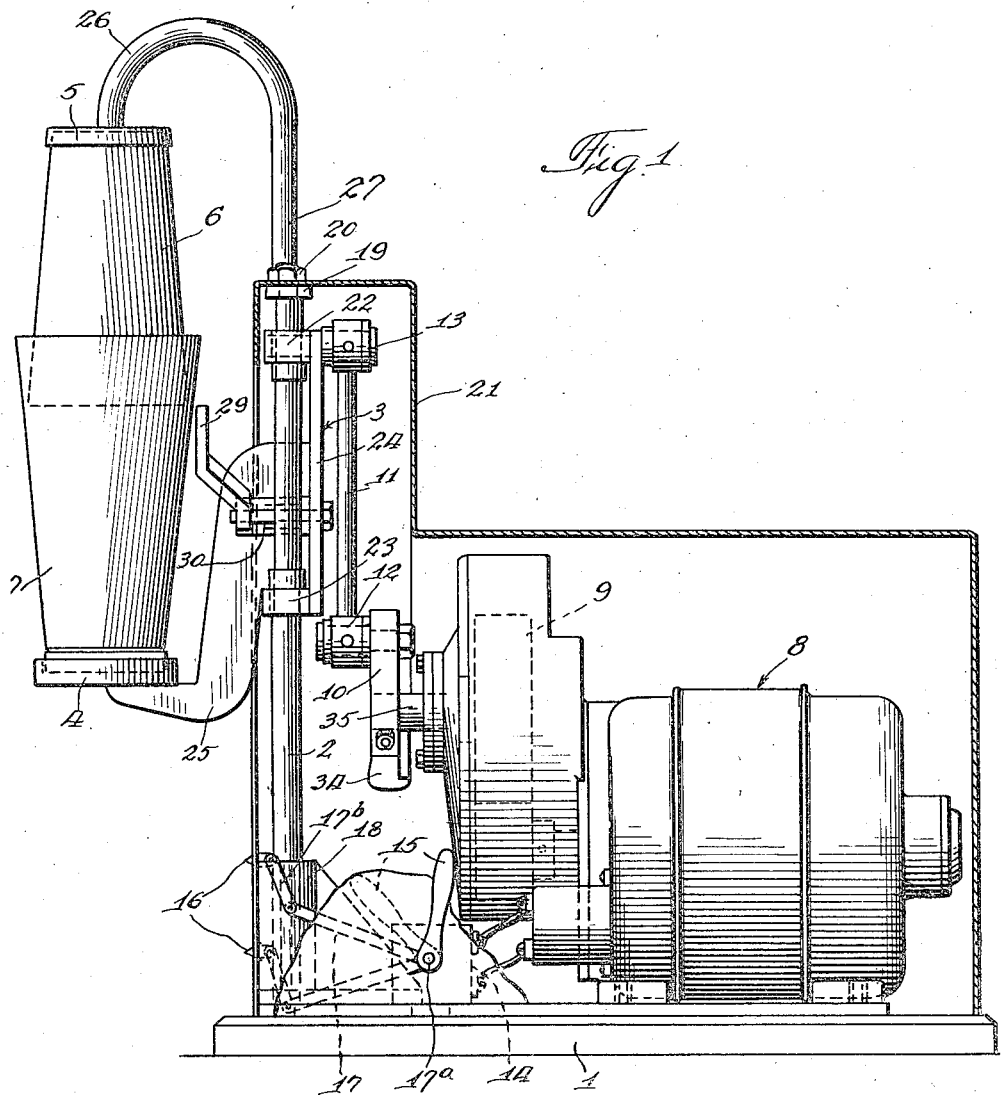
Figure 1 is a side elevational view of a beverage shaker, parts of the casing being shown in section.

Referring to the drawings in detail, the construction shown comprises an elongated flat base 1, a pair of vertical guide rods 2 secured to and extending upwardly from one end of this base, a crosshead 3 slidably mounted on these guide rods 2, a pair of clamping jaws 4 and 5 for gripping the beverage container 6 and cover 7, mounted on this crosshead, a rotary electric motor 8 mounted on the base, a speed reduction gearing 9 mounted on the electric motor 8, a crank 10 driven by the speed reduction gearing, and a connecting rod 11 extending between the crank 10 and crosshead 3 having its lower end connected with the crank 10 by means of a crank pin 12 and having its upper end connected with the crosshead 3 by means of a stud 13. Suitable means are provided whereby the attendant can predetermine the duration of the shaking operation comprising means adjustable by the attendant for stopping the operation of the motor after a predetermined time has elapsed.

The means shown for this purpose comprise a switch 14 for starting and stopping the electric motor 8, an operating lever 15, time-controlled in its movement in one direction for controlling this switch 14, a slidable indicator pointer 16 for enabling the operator to predetermine the time of operation of the motor, and connections between this pointer and the operating lever whereby the movement of the pointer 16 corresponds in extent to the movement of the switch lever 15. These connections comprise a rock arm 17 mounted on the rock shaft 17a, on which the switch lever 15 is mounted, and a link 17b connecting this rock arm with the slidable pointer. The pointer cooperates with a suitable scale on the casing showing the number of seconds which will elapse before the switch will be opened to stop the motor. In operating this time switch, the attendant shifts the switch lever 15 until the pointer 16 is opposite the desired indicium on the scale 17c and then releases the lever, whereupon the lever 15 will start its time-controlled return movement. At the end of its time-controlled movement, the switch 14 will be opened to cause the motor 8 to stop.

The vertical guides 2 may be mounted in suitable socket members 18 in the base 1 and may be secured together at their upper ends by means of a crossbar 19 extending between the guides 2 and secured to the guides by means of cap screws 20 which may also serve to hold the sheet metal cover 21 in place. The crosshead 3 may comprise upper and lower slides 22 and 23 having openings to receive the guides 2, and a plate 24 extending between these slides 22 and 23 and secured thereto. The lower fixed clamping jaw 4 may be on a bracket 25 secured to this plate 24 in any suitable manner. The upper slidable clamping jaw 5 is mounted on the curved upper end 26 of the rod 27, which is slidably mounted in the two slide members 22 and 23. A coil compression spring 28 is provided surrounding this rod 27 which urges the slidable jaw 5 toward the fixed jaw 4. For opening this slidable jaw against the spring action, an operating lever 29 is provided secured to a rock shaft 30 oscillatably mounted in the bracket 25, this rock shaft 30 having secured thereto a rock arm 31 (Figs. 2, 4 and 5) slotted to receive a pin 32 secured to the rod 27 which carries the movable jaw 5. By pressing down on this operating lever 29, the movable jaw 5 may be moved away from the fixed jaw 4 to permit the insertion or removal of the beverage container 6 and the cover 7 therefor. The slidable movement of the movable jaw may be limited by means of a slot 33 in the plate 24, in which the pin 32 secured to the slidable jaw carrying rod 27 operates.

In order to insure smooth operation, means are provided for counterbalancing the gravitational and inertia effects of the container parts 6 and 7 and their contents, the jaws 25 and 26, the crosshead 3, link 11, and the crank 10. The means provided for this purpose comprises a counterweight 34, rotatable with the crank shaft 35 and oppositely disposed with respect to the crank 10, this counterweight being proportioned and designed so as to counterbalance the said gravitational and inertia effects.

In using the apparatus, the ingredients of the beverage are placed in the container 6, the cover 7 is placed on the container, the lever 29 is depressed to open the jaws, the container and cover are turned upside down and placed in position to be clamped, and the lever 29 is then released to allow the spring 28 to move the slidable jaw 5 toward the fixed jaw 4 to clamp the beverage container 6 and cover 7 securely in position. The motor 8 is then put in operation to effect a rapid up-and-down movement of the crosshead 3 and a thorough shaking of the beverage in the container 6. After the predetermined time has elapsed, the motor automatically stops. The attendant can then remove the container and cover by pressing down on the lever 29 to release the jaws from gripping engagement with the container and cover. It will be seen that the shaking operation requires very little time on the part of the attendant, as he can simply place the container and cover in position in the machine, start the operation of the machine, and then attend to other matters, knowing that the motor will stop after a predetermined time during which the beverage will be thoroughly shaken and mixed.

Further modifications will be apparent to those skilled in the art and it is desired, therefore, that the invention be limited only by the prior art and the scope of the appended claims.

Having thus described by invention, what I claim and desire to secure by Letters Patent is:

1. A beverage shaking apparatus comprising a base, vertical guide means mounted on the extending upwardly from the front end of said base, a motor mounted on said base in the rear of said guide means, an elongated carriage having bearing means adjacent its upper and lower ends slidably mounted on said guide means, a rotary horizontal crank shaft extending longitudinally of the base and driven by said motor, a crank shaft mounted on said crank shaft having a crank pin, a connecting rod pivotally connected at its lower end with said crank pin and at its upper end with the upper end of said sliding carriage, gripping means mounted on said carriage for holding the container in front of said carriage, said gripping means comprising a lower jaw extending downwardly and forwardly from said carriage and an upper jaw extending forwardly and upwardly from said carriage, and a casing for housing said motor, crank shaft, crank, connecting rod, guide means and carriage having an opening in its front side through which said lower jaw extends and in which it moves.

2. A beverage shaking apparatus comprising a base, vertical guide means mounted on and extending upwardly from the front end of said base, a motor mounted on said base in the rear of said guide means, an elongated carriage having bearing means adjacent its upper and lower ends slidably mounted on said guide means, a rotary horizontal crank shaft extending longitudinally of the base and driven by said motor, a crank mounted on said crank shaft having a crank pin, a connecting rod pivotally connected at its lower end with said crank pin and at its upper end with the upper end of said sliding carriage, gripping means mounted on said carriage for holding the container in front of said carriage, said gripping means comprising upper and lower jaws, the lower jaw having a gripping portion below the pivotal connection of the connecting rod with the carriage, and a casing for housing said motor, crank shaft, crank, connecting rod, guide means and carriage having an opening in its front side through which said lower jaw extends and in which it moves.

3. A beverage shaking apparatus comprising a base, vertical guide means mounted on and extending upwardly from the front end of said base, a motor mounted on said base in the rear of said guide means, an elongated carriage having bearing means adjacent its upper and lower ends slidably mounted on said guide means, a rotary horizontal crank shaft extending longitudinally of the base and driven by said motor, a crank mounted on said crank shaft having a crank pin, a connecting rod pivotally connected at its lower end with said crank pin and at its upper end with the upper end of said sliding carriage, gripping means mounted on said carriage for holding the container in front of said carriage, said gripping means comprising upper and lower jaws, the lower jaw having a gripping portion below the pivotal connection of the connecting rod with the carriage, and a casing for housing said motor, crank shaft, crank, connecting rod, guide means and carriage having an opening in its front side through which said lower jaw extends and in which it moves, the center line of said jaws lying substantially in a vertical plane through said crank shaft.

4. A beverage shaking apparatus comprising a base, vertical guide means mounted on said base, a motor mounted on said base, a carriage slidably mounted on said guide means, transmission from said motor to said carriage for effecting reciprocating motion of said carriage, a pair of jaws for gripping a beverage container mounted on said carriage, spring means for pressing one of said jaws toward the other for gripping the container, and means for opening the jaws comprising a lever pivotally mounted on said carriage for acting on said spring-pressed jaw to open it against the action of the spring-pressed means.

VINCENT L. SHAW.

CERTIFICATE OF CORRECTION.

Patent No. 2,146,860. February 14, 1939.

VINCENT L. SHAW.

It is hereby certified that error appears in the printed specification of the above numbered patent requiring correction as follows: Page 2, first column, line 58, claim 1, strike out the word "shaft" first occurrence; and that the said Letters Patent should be read with this correction therein that the same may conform to the record of the case in the Patent Office.

Signed and sealed this 4th day of April, A. D. 1939.

Henry Van Arsdale (Seal) Acting Commissioner of Patents.